United States Patent [19]

Eckel et al.

[11] Patent Number: 4,952,194
[45] Date of Patent: Aug. 28, 1990

[54] ROTATABLE ELASTIC COUPLING

[75] Inventors: Hans-Gerd Eckel; Heinz Seifert, both of Laudenbach, Fed. Rep. of Germany

[73] Assignee: Firma Carl Freudenberg, Weinheim/Bergst., Fed. Rep. of Germany

[21] Appl. No.: 254,362

[22] Filed: Oct. 6, 1988

[30] Foreign Application Priority Data

Oct. 15, 1987 [DE] Fed. Rep. of Germany ....... 3734897

[51] Int. Cl.$^5$ .................................................. F16D 3/72
[52] U.S. Cl. ........................................ 464/60; 464/57; 464/59
[58] Field of Search ..................... 464/51, 57, 58, 59, 464/60

[56] References Cited

U.S. PATENT DOCUMENTS

| | | | |
|---|---|---|---|
| 1,950,448 | 3/1934 | Heisterkamp | 464/57 |
| 2,907,189 | 10/1959 | Flieg | 464/57 |
| 2,945,714 | 7/1960 | Egger | 464/57 X |
| 3,030,783 | 4/1962 | Schmidt | 464/57 |
| 3,091,947 | 6/1963 | Thomsen | 464/59 |
| 3,726,370 | 4/1973 | Hubbard, Jr. | 464/57 X |

FOREIGN PATENT DOCUMENTS

| | | | |
|---|---|---|---|
| 2331588 | 1/1975 | Fed. Rep. of Germany . | |
| 309170 | 7/1971 | U.S.S.R. | 464/59 |
| 527294 | 10/1940 | United Kingdom | 464/57 |

Primary Examiner—Daniel P. Stodola
Attorney, Agent, or Firm—Kenyon & Kenyon

[57] ABSTRACT

A rotatable elastic coupling for connecting two relatively rotatable shaft ends comprising a coiled spring having ends that are fixed to a respective shaft end. One of the shaft ends is provided with an extension that axially extends into the interior of the spring. In the region adjacent to the spring ends, an intermediate portion of the spring is radially spaced from the extension. A gap formed by the radial spacing between the intermediate spring portion and the extension is defined between an inner abutment surface of the spring portion and an outer abutment surface on the extension. Relative rotation of the shafts reduces the gap until the abutment surfaces come into contact and a rotational limit is reached.

10 Claims, 2 Drawing Sheets

ROTATABLE ELASTIC COUPLING

BACKGROUND OF THE INVENTION

The invention relates generally to a rotatable elastic coupling and more particularly to a rotatable elastic coupling for transmitting torque between two shafts.

A rotatable elastic coupling for two shaft ends having a coiled spring defining an interior space therein with the ends of the springs fixed to a respective shaft end is disclosed in DE-OS No. 23 31 588. The portion of the spring disposed between the spring ends is freely movable in radial direction. This may lead to undesirable imbalance when relatively high rotational speeds are introduced. In addition, the overload safety of these type couplings when submitted to high torque is not very satisfactory.

The problem to which the invention is directed is provision of a rotatable elastic coupling that is balanced even when subject to extremely high rotational speeds and that achieves a distinct improvement of the overload safety of the coupling. In addition, the invention is directed to the problem of providing a coupling capable of transmitting torque in any direction that avoids the above-noted disadvantages.

SUMMARY OF THE INVENTION

The invention solves these problems by provision of a rotatable elastic coupling for two shaft ends comprising a first spring coiled in a first direction having first and second ends and an interior therebetween, a first shaft having a first shaft end to which the first spring end is fixedly attached, a second shaft having a second shaft end to which the second spring end is fixedly attached and an axial extension fixedly attached to one of the first and second shaft ends. The axial extension extends into the interior of the spring and includes an outer surface radially spaced from a portion of the spring to define a gap therebetween in the region adjacent the first and second shaft ends whereby at a predetermined relative rotation of the shaft ends in the first direction the gap is eliminated as the spring portion abuts against the outer surface.

The spring should be dimensioned, formed and installed to make it stiff enough such that during operation, eccentric displacements and imbalances are negligibly small regardless of position.

The gap should have a very small width that is just large enough for sufficient relative movement between the spring and the axial extension when torque is transmitted. In cases where the spring has an especially small depth, the axial extension may also radially guide the spring. In this manner, undesirable radial displacements at high rotational speeds can be avoided with certainty.

During overload when torques which far exceed the intended torque are applied to the coupling, the abutment surfaces of the spring and of the axial extension contact whereby not only the bending elasticity, but also the tensile stress capacity of the material forming the spring is available for transmission of the torque. In this manner, damage to the spring and hence to the coupling is effectively avoided to a very large extent even under high overload conditions.

The spring may have a moment of inertia that is reduced in the direction of the spring ends. This can be achieved, for example, by reducing the cross sectional area of the spring along the length of the spring in the direction of the spring ends. The advantage of this design is that an overload of the coupling causes the spring to become increasingly stiffer by increasing the length of its coils as the spring is loaded. The transition from the flexible to the rigid transmission behavior of the coupling of the invention thereby is made uniform to reduce the danger of overloadrelated damage to connected machine parts.

The spring of the coupling of the invention may be formed as a helical spring, which enables provision of the coupling with an especially small outside diameter. In other cases, where very little space is available in axial direction, use of spiral springs has proved advantageous.

Use of the coupling of the invention always results in a relatively large reduction of the gap, i.e., the spacing between the flexible portions of the spring and of the abutment surface of the axial extension. This is ultimately manifested as a relatively large reduction in the tensile stress of the spring when compared to known couplings. An increase in the imbalance of the coupling thereby does not occur even at the highest rotational speeds. The coupling of the invention is therefore especially suitable for applications that must accommodate high shaft speeds.

The above-described coupling embodiments are intended for those instances in which transmission of torque in a single given direction, namely, in the first direction is desired. For applications in which the application direction of the torque changes, the rotatable elastic coupling of the invention further comprises a second spring adjacent to the first spring. The second spring may be of the same design as the first spring and may have an opposite coiling direction such that a portion of the second spring abuts against the abutment surface of the extension at a predetermined relative rotation of the shaft ends in the second direction. The spring stiffness of the second spring may differ from that of the first spring, thereby making it possible to improve the vibration isolation of the coupling, for instance, when force transmission for braking and for driving both are required. The relative rotation of the two shaft ends in the second direction also is limited to a fixed value. In the same manner as described above, coupling imbalances at extremely high speeds are reliably avoided during rotation in the second direction.

The first spring and second springs may, surprisingly, form integral sections of a continuous helix spring when the second shaft end is connected to the helix spring at a point intermediate the ends of the helix. This greatly facilitates manufacture of a coupling of the invention that is suitable for torque transmission in both directions of rotation.

In order to achieve a good damping effect, the spring or springs and the shaft ends may be arranged in a sleeve defining therewith an annular space that is filled with a viscous substance. The substance may be, for example, a silicone oil.

The subject matter of the invention is further explained below with reference to the attached drawings.

BRIEF DESCRIPTION OF THE INVENTION

DETAILED DESCRIPTION

Figure 1:
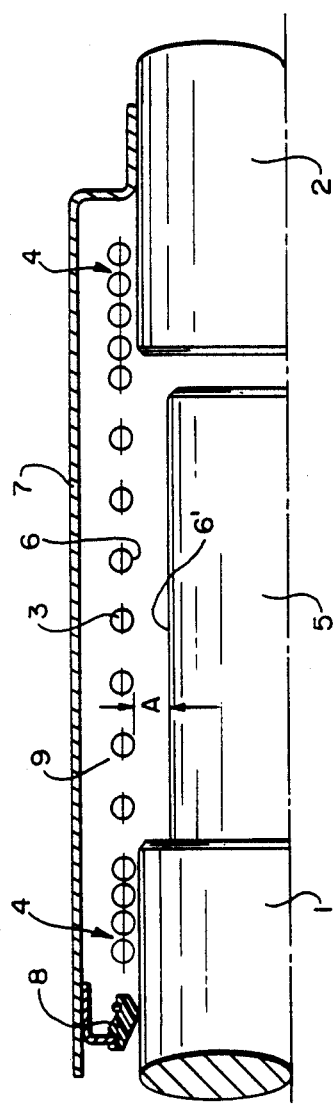
FIG. 1 illustrates a partial sectional view of a rotatable elastic coupling constructed according to the principles of the invention showing a helical spring connected between the shaft ends.

The rotatable elastic coupling shown in FIG. 1 serves to transmit torque between the ends 1 and 2 of two shafts that are concentrically arranged on a common axis of rotation The space between the two shaft ends 1, 2 is bridged by a helical spring 3. Distal ends 4 of the spring are fixedly attached to a respective shaft end 1, 2. In this manner, spring ends 4 are not rotatable relative to the respective shaft ends.

The end face of shaft end 1 is provided with an axial extension 5 which may comprise a cylindrical steel pin. Extension 5 axially extends into the interior of spring 3 at a small annular spacing A from the inner side of spring 3. The inner side of intermediate coils of spring 3 has a surface 6 that faces the outer cylindrical surface 6' of the extension 5. These mutually opposing surfaces 6, 6' define the extent of annular gap A and are capable of abutment upon a predetermined relative rotation of the shafts to limit the relative rotation.

The direction of rotational movements transmitted must coincide with the winding or coiling direction of the spring 3 such that, depending on the magnitude of the torque transmitted, a reduction of the gap A results. The reduction is designed to be small such that when the usual or intended torque is transmitted, a certain residual spacing A still exists. This ensures sufficient mobility of spring 3 relative to the extension 5. However, in an overload condition when the applied torque is much greater than the intended torque, surfaces 6, 6' about to eliminate gap A. Thus, in the overload condition both the elastic and tensile stress capacities of the spring material are available to transmit the high torque.

The shaft end 2 shown in the riqht portion of FIG. 1 may be sealingly connected with a sleeve 7 fully bridging the space between the shaft ends 1, 2. In the left portion of FIG. 1 the sleeve carries sliding seal 8, which resiliently abuts against the outer circumference of shaft end 1. In this manner, the annular cavity 9 enclosed by sleeve 7 is sealed and may be completely filled with a high-viscosity substance, such as silicone oil, to produce good damping of introduced vibrations.

Figure 2:
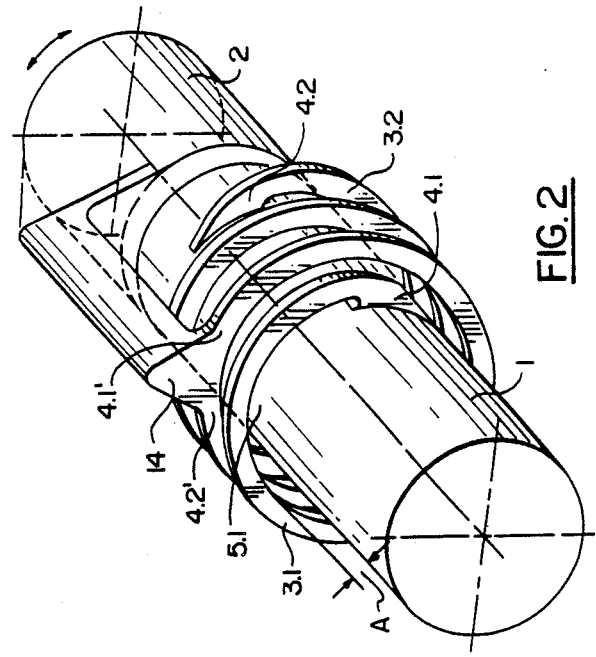
FIGS. 2 and 2a illustrate, in perspective views from above, embodiments of rotatable elastic couplings constructed according to the invention capable of transmitting torque in either direction in which the spring comprises two axially adjacent springs.

The coupling shown in perspective in FIG. 2 is suitable for transmitting torques of any direction, i.e., clockwise or counter-clockwise. In this embodiment, the coupling comprises a first spring 3.1 having ends 4.1, 4.1' and a second spring 3.2 having ends 4.2, 4.2', with each spring formed as a helical spring. Spring ends 4.1 and 4.2 are fixedly connected to shaft end 1 while spring ends 4.1' and 4.2' are fixedly connected to a projection 14 of shaft end 2 at a point intermediate spring ends 4.1 and 4.2. The first and second springs may comprise integral components of a single spring helix continuously wound in the same direction. The cylindrical extension 5.1 of shaft end 1 passes through both springs and has the same diameter as the diameter of shaft end 1. Therefore, there is no step between the extension 5.1 and shaft end 1. Connection of the spring ends in this manner results in the relative movement of the shaft ends of this coupling being limited in both directions of rotation by the mutual contact between the spring 3.1 or 3.2 under tensile stress and the associated abutment surface on the extension 5.1. For instance, if shaft end 1 is rotated clockwise relative to shaft end 2, spring 3.1 tightens or winds inwardly to reduce gap A while spring 3.2 tends to unwind. On the other hand, if shaft end 1 is rotated counter-clockwise relative to shaft end 2, spring 3.2 tightens inwardly to reduce gap A while spring 3.1 tends to unwind. The springs 3.1 and 3.2 may be designed such that abutment of the inner spring surfaces and the outer surface of extension 5.1 occurs at relative rotations in either direction of an angle of about 90°. If the relative rotation is limited in both directions to an angle of about 90°, coupling imbalances can be avoided to a very large extent. Couplings so designed therefore are suitable for the transmission of torques at rotational speeds of up to 10,000 r.p.m.

Figure 2A:
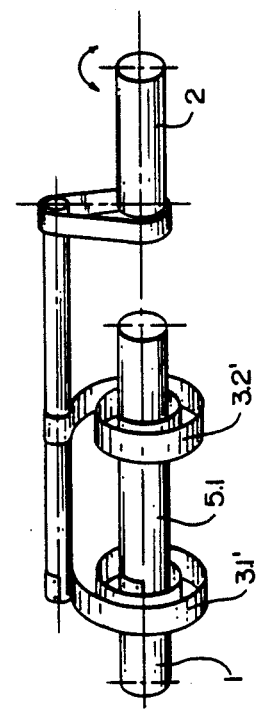

A coupling functionally equivalent to the coupling of FIG. 2 is shown in FIG. 2a which illustrates spiral springs 3.1' and 3.2' being coiled in opposite directions. For purposes of illustration, the axial spacing of the two springs 3.1' and 3.2' as well as the radial spacing between their respective spirals are exaggerated. It is this radial spacing that may be diminished to define the limits of rotation. When no more radial space exists between all of the spring spirals and the abutment surface of the shaft extension 5.1, a rotational limit is reached. Similar to the FIG. 2 embodiment, the maximum angle of rotation may be about 90° in either direction. Additionally, the springs 3.1' and 3.2' may have different stiffnesses.

Figure 3:
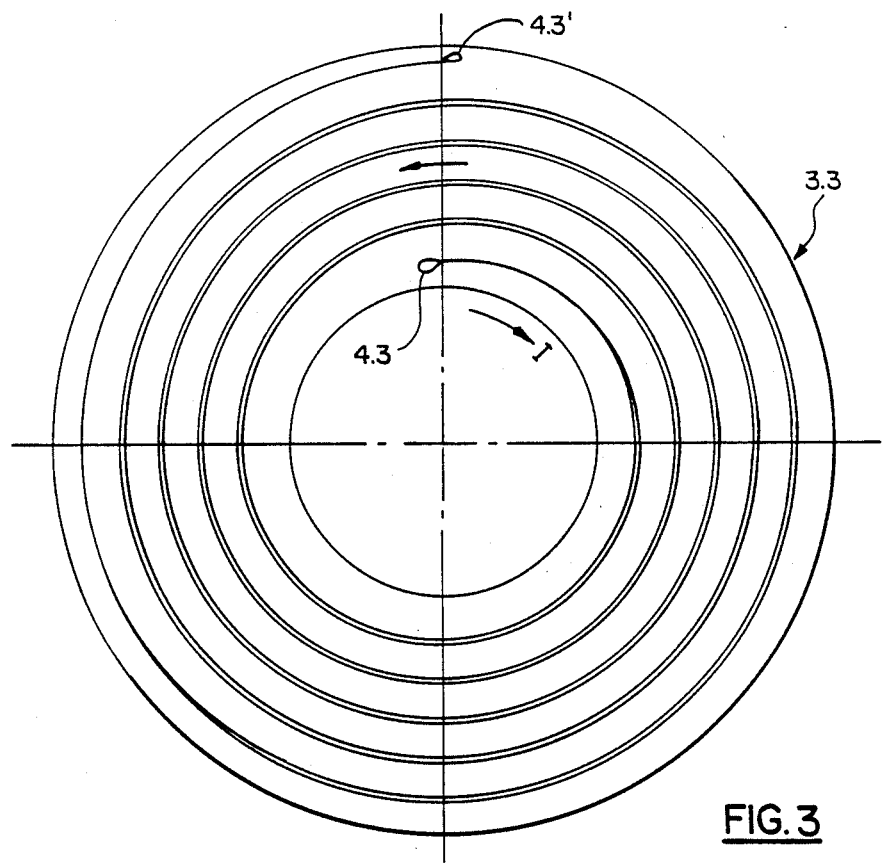
FIG. 3 illustrates a top view of spiral spring that may be used in the rotatable elastic coupling of the invention.
Figure 4:
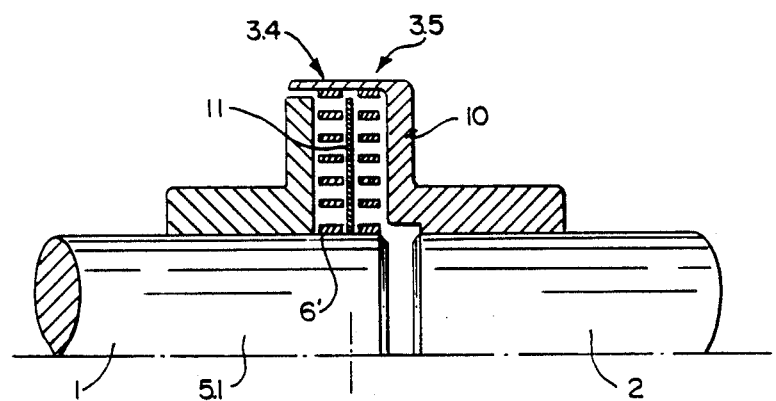
FIG. 4 illustrates a partial sectional view of a rotatable elastic coupling constructed according to the invention showing the spring comprising two axially adjacent, oppositely coiled, spiral springs.

In FIG. 3 a spiral spring 3.3 is shown which may be used with rotatable elastic couplings of the invention. Spring 3.3 extends between inner and outer symmetrical rings. The spring ends 4.3, 4.3' merge with a respective one of these rings. The rings and the spring spirals have a rectangular cross section, such as shown in FIG. 4. This enables the individual spring spirals to support each other under relatively high compressive loads as the radial spacing therebetween is decreased. Also, the cross sectional area of the spring may diminish along the length of the spring from the center of the spring towards both spring ends to obtain an especially soft, spring characteristic.

FIG. 4 shows an embodiment of the coupling of the invention, partly in section, in which two springs 3.4 and 3.5 are provided. The springs are formed as spiral springs and oppositely coiled such that, regardless of the direction of rotation, the radial spacing in one of the springs 3.4, 3.5 between the abutment surface 6 (or the portions of the spring already wound thereon) and the portions of the spring still movable radially inward diminishes. When the radial spacing completely diminishes a rotation limit is reached. In this manner, the relative rotation of the shaft ends may be limited to a fixed value, regardless of the particular direction of rotation. As previously mentioned the limit may be approximately 90° to preclude the adverse occurrence of imbalances at high rotational speeds. In the example shown, the two separate springs have been provided that are arranged side by side. Alternatively, in a manner similar to the embodiment of FIG. 2, springs 3.4 and 3.5 may form sections of a continuous spiral wound in a single direction.

Regardless of whether separate or integral springs are used, the radially inward spring end is fixed to the shaft end 1, while the radially outward spring end is fixed to a bell housing 10, which is nonrotatably connected to the shaft end 2 shown at right. In the dual spring embodiment, a rotatable partition 11 is disposed between the two springs, which comprises a metal disk having friction-reducing surfaces.

Besides providing excellent isolation of induced rotary vibrations, the coupling of FIG. 4 shows no signs of imbalance even at extremely high rotational speeds. Therefore, it is especially suitable for use with the power train of a motor vehicle.

What is claimed is:

1. A rotatable elastic coupling for two shaft ends, comprising:
   (a) a first spring coiled in a first direction having first and second ends and an interior therebetween;
   (b) a second spring coiled in said first direction having first and second ends and an interior therebetween, said second spring being disposed adjacent to said first spring such that the second ends of said first and second springs are adjacent;
   (c) a first shaft having a first shaft end to which the first ends of said first and second springs are fixedly attached;
   (d) a second shaft having a second shaft end with a projection extending therefrom to which the second ends of said first and second springs are fixedly attached; and
   (e) an axial extension fixedly attached to one of said first and second shaft ends, said axial extension extending into the interior of the springs and including an outer surface radially spaced from a portion of the springs to define a gap therebetween in the region adjacent the first and second shaft ends whereby at a predetermined relative rotation of the shaft ends in the first direction the gap is eliminated as a portion of said first spring abuts against said outer surface and at a predetermined relative rotation of the shaft ends in a second direction opposite said first direction said gap is eliminated as a portion of said second spring abuts against outer surface.

2. A rotatable elastic coupling according to claim 1 wherein said first spring has a constant cross sectional area over the length of the first spring.

3. A rotatable elastic coupling according to claim 1 wherein said first spring has a cross sectional area that decreases over the length of the first spring toward the first and second spring ends.

4. A rotatable elastic coupling according to claim 1 wherein said first spring is formed as a helical spring.

5. A rotatable elastic coupling according to claim 1 wherein said first and second springs are formed as a spiral spring.

6. A rotatable elastic coupling according to claim 1 wherein said first and second springs comprise integral sections of a continuous helix spring.

7. A rotatable elastic coupling according to claim 6 wherein the second ends of said first and second springs are connected to said projection of said second shaft end at a point intermediate said first and second shaft ends.

8. A rotatable elastic coupling according to claim 1 further comprising a sleeve surrounding said shaft ends and defining therewith an annular space containing said first spring, said annular space being filled with a viscous substance.

9. A rotatable elastic coupling according to claim 1 wherein said axial extension is a continuation of said first shaft end, the first end of said first spring is fixedly attached to said first shaft end and the first end of said second spring is fixedly attached to said axial extension.

10. A rotatable elastic coupling according to claim 9 wherein said first shaft end and said axial extension have equal diameters.

* * * * *

UNITED STATES PATENT AND TRADEMARK OFFICE
CERTIFICATE OF CORRECTION

PATENT NO. : 4,952,194
DATED : August 28, 1990
INVENTOR(S) : Hans-Gerd Eckel et al It is certified that error appears in the above-identified patent and that said Letters Patent is hereby corrected as shown below:

In Column 2, line 6, chang "...overloadrelated damage..." to read --...overload related damages...--

Column 3, line 41, change "about to eliminate..." to read --...abut to eliminate...--

Column 6, line 4, claim 1, change "against outer surface." to read --against said outer surface.--

Signed and Sealed this

Seventeenth Day of March, 1992

Attest:

HARRY F. MANBECK, JR.

Attesting Officer

Commissioner of Patents and Trademarks